United States Patent
Yasuhara et al.

(10) Patent No.: US 10,071,768 B2
(45) Date of Patent: Sep. 11, 2018

(54) AUTOMOBILE BODY STRUCTURE AND METHOD FOR SETTING STRENGTH OF FRONT SIDE FRAME

(71) Applicant: HONDA MOTOR CO., LTD., Minato-ku, Tokyo (JP)

(72) Inventors: Shigeto Yasuhara, Wako (JP); Tomoya Yabu, Wako (JP); Katsuyuki Awano, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 287 days.

(21) Appl. No.: 14/901,646

(22) PCT Filed: Jun. 11, 2014

(86) PCT No.: PCT/JP2014/065444
§ 371 (c)(1),
(2) Date: Dec. 28, 2015

(87) PCT Pub. No.: WO2015/001928
PCT Pub. Date: Jan. 8, 2015

(65) Prior Publication Data
US 2016/0159399 A1    Jun. 9, 2016

(30) Foreign Application Priority Data

Jul. 2, 2013   (JP) ................... 2013-138722
Jul. 2, 2013   (JP) ................... 2013-138723

(51) Int. Cl.
*B62D 21/15*    (2006.01)
*B62D 25/08*    (2006.01)
(Continued)

(52) U.S. Cl.
CPC .............. *B62D 21/152* (2013.01); *B60K 6/20* (2013.01); *B62D 21/11* (2013.01); *B62D 25/082* (2013.01);
(Continued)

(58) Field of Classification Search
CPC .... B62D 21/11; B62D 21/152; B62D 25/085; B62D 25/082; B62D 25/2018; B62D 29/005
See application file for complete search history.

(56) References Cited

U.S. PATENT DOCUMENTS 3,202,451 A * 8/1965 Auger ................... B62D 21/10
                                                    296/204
4,919,474 A * 4/1990 Adachi ................ B62D 25/082
                                                    296/198
(Continued)

FOREIGN PATENT DOCUMENTS

JP     64-036583 A    2/1989
JP     H04-143173 A   5/1992
(Continued)

*Primary Examiner* — Frank B Vanaman
(74) *Attorney, Agent, or Firm* — Carrier Blackman & Associates, P.C.; Joseph P. Carrier; Jingli Wang

(57) ABSTRACT

Since a front side frame, whose rear end is fixed to a front face of a dashboard lower panel of a vehicle body formed into a bathtub shape, includes a fixed portion, an inclined portion, a bent portion and a horizontal portion, when the collision load of a frontal collision is input into the front end of the front side frame, the fixed portion and the bent portion buckle so as to bend back, and the upper face of the inclined part abuts against the front face of the dashboard lower panel, thus making it possible to absorb the collision energy by deformation of the front side frame itself, and to increase the area over which the load is transmitted from the front side frame to the dashboard lower panel to thus disperse the load, thereby reducing the reaction force required for the dashboard lower panel.

7 Claims, 11 Drawing Sheets

(51) Int. Cl.
    *B62D 25/20*     (2006.01)
    *B62D 29/00*     (2006.01)
    *B60K 6/20*      (2007.10)
    *B62D 21/11*     (2006.01)
    *B62D 25/14*     (2006.01)
    *B62D 29/04*     (2006.01)

(52) U.S. Cl.
    CPC ......... *B62D 25/085* (2013.01); *B62D 25/088* (2013.01); *B62D 25/14* (2013.01); *B62D 25/2018* (2013.01); *B62D 29/005* (2013.01); *B62D 29/043* (2013.01)

(56) References Cited

U.S. PATENT DOCUMENTS

| | | | | |
|---|---|---|---|---|
| 5,024,484 A | * | 6/1991 | Buchacz | A47C 3/20 297/300.3 |
| 6,435,603 B1 | | 8/2002 | Ohmura et al. | |
| 6,505,808 B1 | * | 1/2003 | Park | B60K 5/12 248/674 |
| 2007/0215402 A1 | * | 9/2007 | Sasaki | B62D 21/152 180/232 |
| 2015/0084375 A1 | * | 3/2015 | Asano | B62D 21/11 296/187.09 |
| 2015/0314810 A1 | * | 11/2015 | Watanabe | B60K 5/12 296/203.02 |
| 2015/0367797 A1 | * | 12/2015 | Kurokawa | B60R 19/34 293/133 |

FOREIGN PATENT DOCUMENTS

| | | |
|---|---|---|
| JP | 3246900 B2 | 1/2002 |
| JP | 2004-330942 A | 11/2004 |
| JP | 2005-280443 A | 10/2005 |
| JP | 2008-049895 A | 3/2008 |
| JP | 2009-083756 A | 4/2009 |

* cited by examiner (A) BEFORE COLLISION (B) AFTER COLLISION

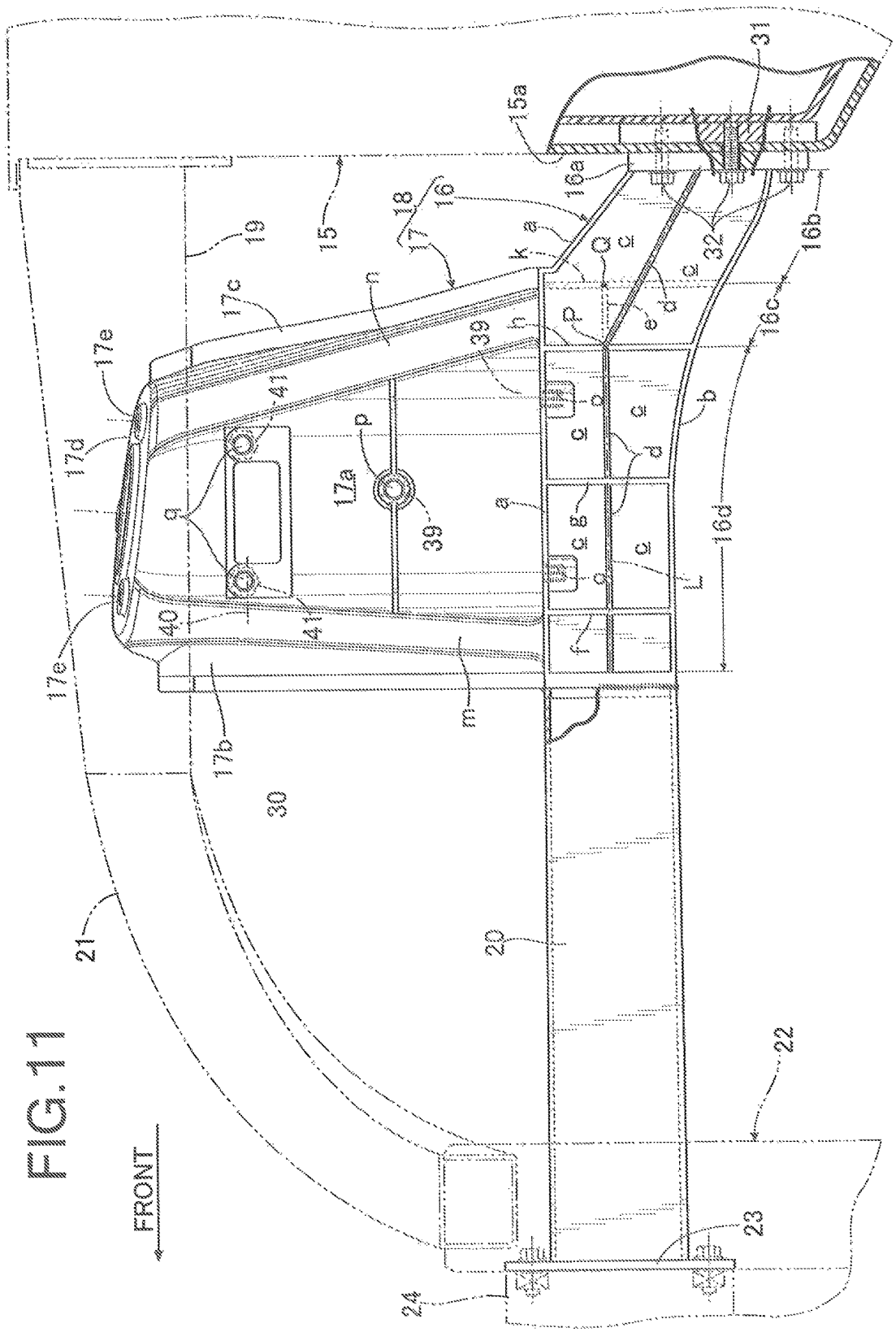

AUTOMOBILE BODY STRUCTURE AND METHOD FOR SETTING STRENGTH OF FRONT SIDE FRAME

TECHNICAL FIELD

The present invention relates to an automobile body structure in which a rear end of a front side frame made of metal is fixed to a front face of a dashboard lower panel of a vehicle body formed into a bathtub shape from a fiber-reinforced resin, and a method for setting the strength of a front side frame applied to this body structure.

BACKGROUND ART

An arrangement in which a front side frame rear is disposed between the rear end of a front side frame main body part and the front face of a dashboard lower panel, the front side frame rear being formed from a honeycomb structure aluminum extrusion and having a trapezoidal shape in plan view, and the front side frame rear being crumpled by the collision load of a frontal collision input into the front side frame main body part and absorbing the collision energy is known from Patent Document 1 below.

Furthermore, an arrangement in which the rear end of a front side frame and the front end of a floor frame are connected via an intermediate frame that is inclined from upper front to lower rear, and a bent part where the front side frame and the intermediate frame are connected is disposed in front of a dashboard lower panel, thus making it difficult for the impact when the bent part is bent back by the collision load of a frontal collision to reach the vehicle compartment is known from Patent Document 2.

RELATED ART DOCUMENTS

Patent Documents

Patent Document 1: Japanese Patent Application Laid-open No. 2009-83756
Patent Document 2: Japanese Patent No. 3246900

SUMMARY OF THE INVENTION

Problems to be Solved by the Invention

The arrangement described in Patent Document 1 above has the problem that, even when a collision load is input and the honeycomb structure front side frame rear crumples, since the contact area between the front side frame rear and the dashboard lower panel does not change, it is impossible to disperse the collision load over a wide region of the dashboard lower panel to thus absorb it.

Furthermore, with regard to the arrangement described in Patent Document 2 above, the rear end of the front side frame, which extends linearly with a constant cross section, is not abutted against and fixed to the dashboard lower panel but is connected to the floor frame via the intermediate frame, and it is therefore difficult to apply this structure to a bathtub-shaped vehicle body, which is molded integrally from a fiber-reinforced resin and does not have an intermediate frame or a floor frame.

The present invention has been accomplished in light of the above circumstances, and it is an object thereof to enhance the collision energy-absorbing performance of a metal front side frame connected to a vehicle body formed into a bathtub shape from a fiber-reinforced resin.

Means for Solving the Problems

In order to attain the above object, according to a first aspect of the present invention, there is provided an automobile body structure in which a rear end of a front side frame made of metal is fixed to a front face of a dashboard lower panel of a vehicle body formed into a bathtub shape from a fiber-reinforced resin, wherein the front side frame comprises a plate-shaped fixed portion that is fixed to the front face of the dashboard lower panel, an inclined portion that extends from the fixed portion upward to the front, a bent portion that bends from a front end of the inclined portion in a substantially horizontal direction, and a horizontal portion that extends from a front end of the bent portion to the front.

Further, according to a second aspect of the present invention, in addition to the first aspect, the front side frame comprises a first reinforcing rib that extends substantially parallel to a line joining centers of cross sections of the inclined portion, the bent portion, and the horizontal portion, and a second reinforcing rib that extends substantially horizontally in a fore-and-aft direction at least in the horizontal portion, and the first reinforcing rib and the second reinforcing rib intersect each other at an intersection part when viewed in a vehicle width direction.

Furthermore, according to a third aspect of the present invention, in addition to the second aspect, the cross-sectional shape of the front side frame comprises a main body part formed into an I-shaped cross section from an upper flange and lower flange extending in the horizontal direction, and a web connecting the upper flange and the lower flange in a vertical direction, and the first reinforcing rib and the second reinforcing rib extend from the web in the horizontal direction.

Moreover, according to a fourth aspect of the present invention, in addition to the third aspect, the web comprises at least two bent parts when viewed in the vertical direction.

Further, according to a fifth aspect of the present invention, in addition to the third or fourth aspect, the main body part integrally comprises a power unit support portion for supporting a power unit.

Furthermore, according to a sixth aspect of the present invention, in addition to any one of the third to fifth aspects, the main body part comprises a vertical rib that extends through the intersection part and connects the upper flange and the lower flange in the vertical direction.

Moreover, according to a seventh aspect of the present invention, there is provided a method for setting the strength of a front side frame of the automobile body structure according to any one of the second to sixth aspects, the method comprises a step of estimating the maximum load that the dashboard lower panel can support, and a step of adjusting a bending position, in the fore-and-aft direction, of the first reinforcing rib of the front side frame so that the collision load that is transmitted from the front side frame to the dashboard lower panel when the vehicle is involved in a frontal collision is no greater than the maximum load.

Further, according to an eighth aspect of the present invention, in addition to the first aspect, the front side frame has a front damper housing formed integrally therewith, a power unit support part is formed on an upper face of the front side frame and an inner face in the vehicle width direction of the front damper housing, the power unit support part supporting via a mount an end part in the vehicle width direction of a power unit integrally having an internal combustion engine, an electric motor and a transmission, and a front ridge line formed between a front wall and a vehicle width direction inner wall of the front damper housing and a rear ridge line formed between a rear wall and the vehicle width direction inner wall of the front damper housing are connected to the front side frame.

Furthermore, according to a ninth aspect of the present invention, in addition to the eighth aspect, the vehicle width direction inner wall of the front damper housing protrudes outwardly in the vehicle width direction from the front side frame.

Moreover, according to a tenth aspect of the present invention, in addition to the eighth or ninth aspect, the front ridge line and the rear ridge line are connected to a middle part in the vehicle width direction of the upper face of the front side frame.

Further, according to an eleventh aspect of the present invention, in addition to any one of the eighth to tenth aspects, the power unit support part of the front side frame is wider than the width in the vehicle width direction of the upper face of the front side frame.

Furthermore, according to a twelfth aspect of the present invention, in addition to any one of the eighth to eleventh aspects, the vehicle width direction inner wall of the front damper housing is curved so as to protrude outwardly in the vehicle width direction, the power unit support part on the front side frame side comprises a mounting fitting hole that has the mount fitted thereinto and a bolt hole that has the mount secured thereto, and the power unit support part on the front damper housing side comprises a bolt hole that has the mount secured thereto and a bolt hole that has a torque rod secured thereto.

Moreover, according to a thirteenth aspect of the present invention, in addition to any one of the eighth to twelfth aspects, the front side frame has a cross-sectional shape comprising a main body part formed into an 'I'-shaped cross section from an upper flange and a lower flange that extend in the horizontal direction and a web that connects the upper flange and the lower flange in the vertical direction, and a first reinforcing rib is formed so as to extend from a front end to a rear end of the main body part, the first reinforcing rib protruding in the horizontal direction from at least one side face in the vehicle width direction of the web.

Further, according to a fourteenth aspect of the present invention, in addition to the thirteenth aspect, a second reinforcing rib protruding in the horizontal direction from at least the other side face in the vehicle width direction of the web is formed so as to extend from the front end to the rear end of the main body part.

Furthermore, according to a fifteenth aspect of the present invention, in addition to the thirteenth or fourteenth aspect, a front side frame extension part formed by extrusion is welded to a part that opens out in a bifurcated shape from the front end of the web in going forward.

A floor part 11 of an embodiment corresponds to the vehicle body of the present invention, a mounting fitting hole 16*f* of the embodiment corresponds to the power unit support part of the present invention, and a fifth reinforcing rib h of the embodiment corresponds to the vertical rib of the present invention.

Effects of the Invention

In accordance with the first aspect of the present invention, since the front side frame, whose rear end is fixed to the front face of the dashboard lower panel of a vehicle body formed into a bathtub shape from a fiber-reinforced resin, includes the fixed portion that is fixed to the front face of the dashboard lower panel, the inclined portion that extends from the fixed portion upward to the front, the bent portion that bends from the front end of the inclined portion in a substantially horizontal direction, and the horizontal portion that extends from the front end of the bent portion to the front, when the collision load of a frontal collision is input into the front end of the front side frame, the fixed portion and the bent portion buckle so as to bend back and the upper face of the inclined part abuts against the front face of the dashboard lower panel, thus not only making it possible to absorb the collision energy by deformation of the front side frame itself, but also making it possible to increase the area over which the load is transmitted from the front side frame to the dashboard lower panel to thus disperse the load, thereby reducing the reaction force required for the dashboard lower panel and enabling the weight to be lightened.

Furthermore, in accordance with the second aspect of the present invention, the front side frame includes the first reinforcing rib, which extends substantially parallel to the line joining the cross section centers of the inclined portion, the bent portion, and the horizontal portion, and the second reinforcing rib, which extends substantially horizontal in the fore-and-aft direction at least in the horizontal portion; since the first reinforcing rib and the second reinforcing rib intersect each other in the intersection part when viewed in the vehicle width direction, when the collision load of a frontal collision is input, the first reinforcing rib is bent in the vicinity of the bent portion while generating a constant reaction force by means of the second reinforcing rib, thus inducing buckling of the front side frame and enhancing the collision energy absorption performance Moreover, in accordance with the third aspect of the present invention, since the cross-sectional shape of the front side frame includes the main body part, which is formed into an 'I'-shaped cross section from the upper flange and the lower flange extending in the horizontal direction and the web connecting the upper flange and the lower flange in the vertical direction, and the first reinforcing rib and the second reinforcing rib extend from the web in the horizontal direction, removal from a mold becomes easy when casting the front side frame, thus cutting the production cost.

Furthermore, in accordance with the fourth aspect of the present invention, since the web includes at least two bent parts when viewed in the vertical direction, it is possible to promote buckling of the front side frame when the collision load of a frontal collision is input, thus further enhancing the collision energy-absorbing performance.

Moreover, in accordance with the fifth aspect of the present invention, since the main body part integrally includes the power unit support portion for supporting a power unit, it is possible to easily support the power unit on the front side frame.

Furthermore, in accordance with the sixth aspect of the present invention, since the main body part includes the vertical rib that extends through the intersection part and connects the upper flange and the lower flange in the vertical direction, it is possible to concentrate stress on the intersection part, thereby promoting bending back of the front side frame.

Moreover, in accordance with the seventh aspect of the present invention, since the maximum load that the dashboard lower panel can support is estimated, and the bending position, in the fore-and-aft direction, of the first reinforcing rib of the front side frame is adjusted so that the collision load that is transmitted from the front side frame to the dashboard lower panel when the vehicle is involved in a frontal collision is no greater than the maximum load, it is possible by a simple adjustment to prevent the load input into the dashboard lower panel from exceeding the maximum load.

Furthermore, in accordance with the eighth aspect of the present invention, since the front side frame has the front damper housing formed integrally therewith, the power unit support part is formed on the upper face of the front side frame and the inner face in the vehicle width direction of the front damper housing, the power unit support part supporting via the mount an end part in the vehicle width direction of the power unit integrally having the internal combustion engine, the electric motor, and the transmission, it is possible to arrange the power unit of a hybrid automobile compactly as a unit in the vicinity of the dashboard lower panel, thus ensuring that there is space for arranging an accessory, etc. in front thereof. Moreover, since the front side frame and the front damper housing are formed integrally, not only can the number of components be cut, but it is also possible to enhance the support strength of the power unit due to the front side frame and the front damper housing reinforcing each other.

In particular, since the front ridge line formed between the front wall and the vehicle width direction inner wall of the front damper housing and the rear ridge line formed between the rear wall and the vehicle width direction inner wall of the front damper housing are connected to the front side frame, the front side frame and the front damper housing can be strongly integrated, the collision load of a frontal collision input into the front side frame is transmitted from both the front side frame and the front damper housing to the vehicle body and dispersed, thereby enhancing the collision energy-absorbing effect.

Moreover, in accordance with the ninth aspect of the present invention, since the vehicle width direction inner wall of the front damper housing protrudes from the front side frame outwardly in the vehicle width direction, it is possible to dispose the front damper, whose upper end is supported on the front damper housing, in a nearly vertical attitude, thereby enabling the load transmitted from a wheel to be efficiently supported by means of the front damper housing.

Furthermore, in accordance with the tenth aspect of the present invention, since the front ridge line and the rear ridge line are connected to a middle part in the vehicle width direction of the upper face of the front side frame, it is possible to reliably transmit the load input into the front side frame to the front damper housing.

Moreover, in accordance with the eleventh aspect of the present invention, since the power unit support part of the front side frame is wider than the width in the vehicle width direction of the upper face of the front side frame, it is possible to increase the dimensions of the mount for supporting the power unit.

Furthermore, in accordance with the twelfth aspect of the present invention, since the vehicle width direction inner wall of the front damper housing curves protrudingly and outwardly in the vehicle width direction, the mount support part on the front side frame side is formed from the mounting fitting hole, into which the mount is fitted, and the bolt hole, which secures the mount, and the mount support part on the front damper housing side is formed from the bolt hole, which secures the mount, and the bolt hole, which secures the torque rod, it is possible to strongly support the power unit on the front side frame and the front damper housing.

Moreover, in accordance with the thirteenth aspect of the present invention, since the front side frame has a cross-sectional shape comprising the main body part formed into an 'I'-shaped cross section while including the upper flange and the lower flange that extend in the horizontal direction and the web that connects the upper flange and the lower flange in the vertical direction, and the first reinforcing rib, which protrudes in the horizontal direction from at least one side face in the vehicle width direction of the web, is formed so as to extend from the front end to the rear end of the main body part, not only is it possible to efficiently transmit the collision load of a frontal collision input into the front end of the front side frame from the rear end of the front side frame to the dashboard lower panel and disperse it, but it is also possible to easily carry out removal from a mold when casting the front side frame, thus enabling the cost of the mold to be reduced.

Furthermore, in accordance with the fourteenth aspect of the present invention, since the second reinforcing rib protruding in the horizontal direction from at least the other side face in the vehicle width direction of the web is formed so as to extend from the front end to the rear end of the main body part, the locally weak portion where the second reinforcing rib stops becomes a trigger, thus promoting buckling of the front side frame.

Moreover, in accordance with the fifteenth aspect of the present invention, since the front side frame extension part, which is formed by extrusion, is welded to a part where the front end of the web bifurcates in going forward, not only can the cost of the mold be cut compared with a case in which the front side frame and the front side frame extension part are cast as a unit, but it is also possible to reliably transmit the collision load of a frontal collision input into the front side frame extension part to the front end of the front side frame.

BRIEF DESCRIPTION OF DRAWINGS

FIG. 11 is a view corresponding to FIG. 3 of the first embodiment. (third embodiment)

EXPLANATION OF REFERENCE NUMERALS AND SYMBOLS

Figure 1:
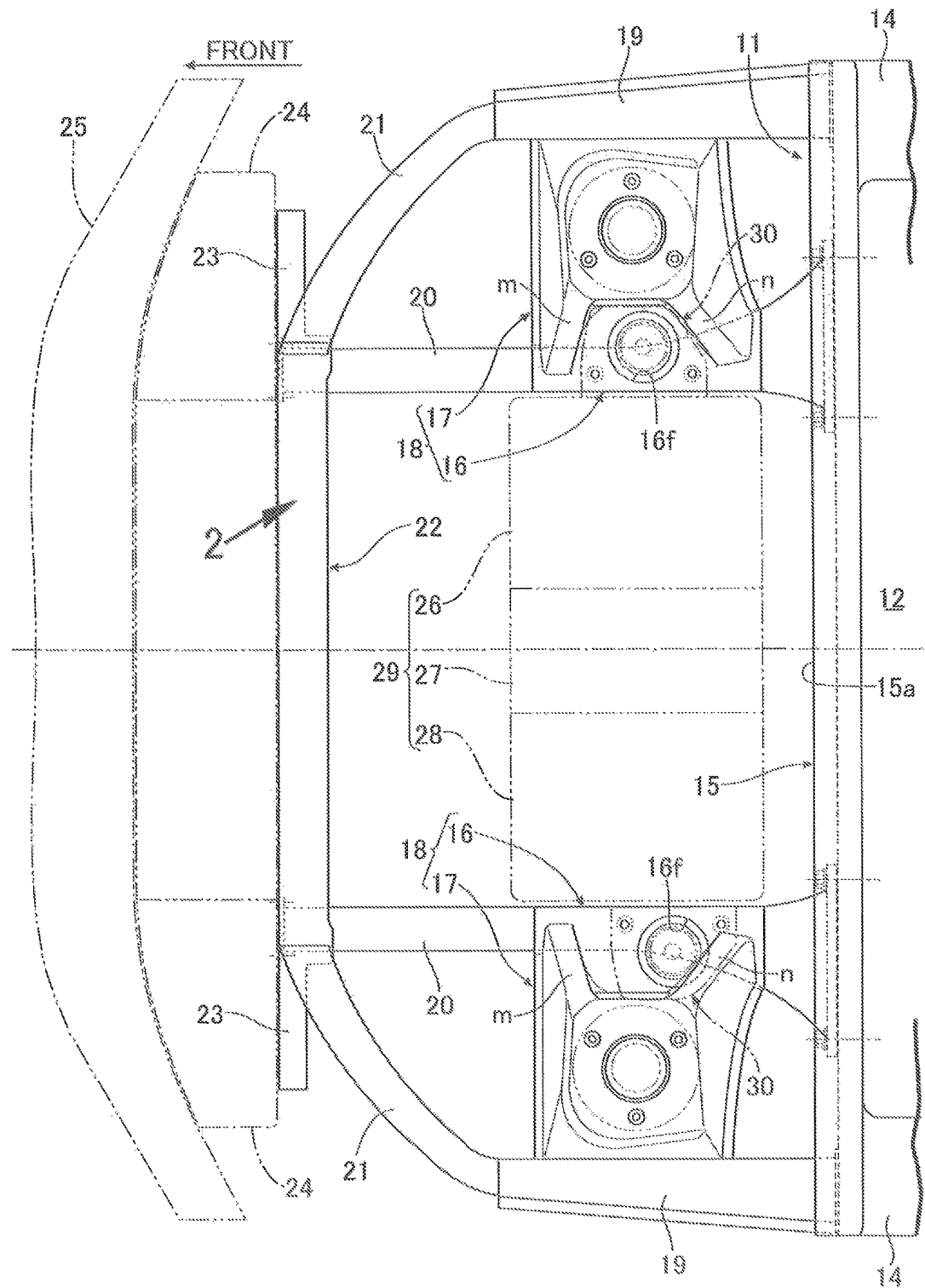
FIG. 1 is a front plan view of a vehicle body frame of an automobile. (first embodiment)

11 Floor part (vehicle body)
15 Dashboard lower panel

15a Front face
16 Front side frame
16a Fixed portion
16b Inclined portion
16c Bent portion
16d Horizontal portion
16f Mounting fitting hole (power unit support portion)
17 Front damper housing
17a Vehicle width direction inner wall
17b Front wall
17c Rear wall
20 Front side frame extension part
26 Internal combustion engine
27 Electric motor
28 Transmission
29 Power unit
30 Mount
40 Torque rod
a Upper flange
b Lower flange
c Web
d First reinforcing rib
e Second reinforcing rib
h Fifth reinforcing rib (vertical rib)
m Front ridge line
n Rear ridge line
o Bolt hole
p Bolt hole
q Bolt hole
L Line joining cross section centers
P Intersection part
R Bent part Best Modes for Carrying out the Invention Embodiments of the present invention are explained by reference to the attached drawings.

First Embodiment

A first embodiment of the present invention is now explained by reference to FIG. 1 to FIG. 9. In the present specification, the fore-and-aft direction, the left-and-right direction (vehicle width direction), and the vertical direction are defined with respect to an occupant seated on a driver's seat.

Figure 2:
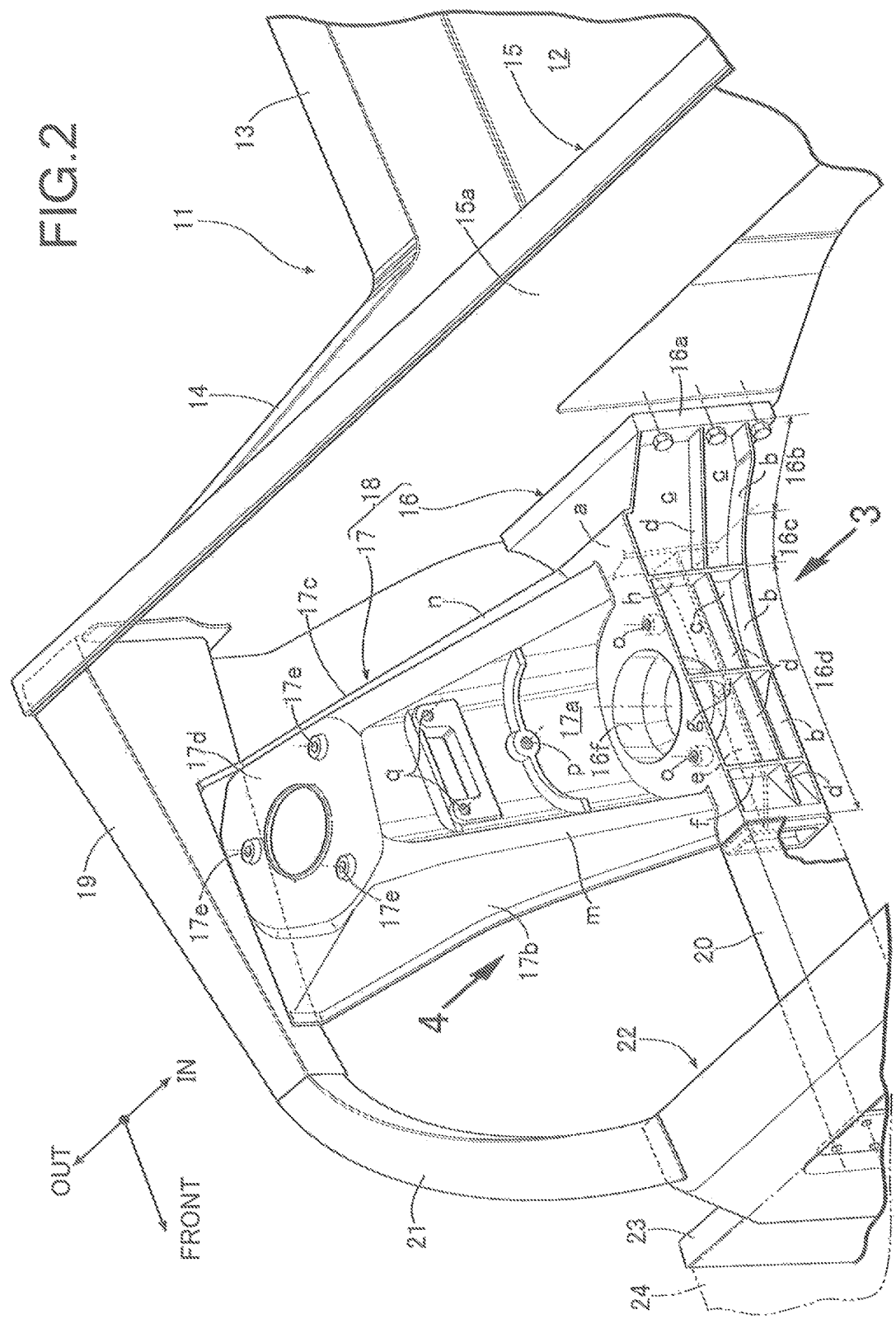
FIG. 2 is a view in the direction of arrow 2 in FIG. 1. (first embodiment)

As shown in FIG. 1 and FIG. 2, a vehicle body of a hybrid automobile includes a bathtub-shaped floor part 11 that is molded integrally from a fiber-reinforced resin such as a carbon fiber-reinforced resin or a glass fiber-reinforced resin. The floor part 11 includes a pair of left and right side sills 13 and 13 extending in the fore-and-aft direction along left and right edges of a floor panel 12, a pair of left and right front pillar lowers 14 and 14 extending obliquely upward to the front from the front ends of the side sills 13 and 13, and a dashboard lower panel 15 connecting the front ends of the side sills 13 and 13 and the front ends of the front pillar lowers 14 and 14.

A pair of left and right cast members 18, made of an aluminum alloy, integrally including a front side frame 16 and a front damper housing 17 are disposed on the left and right on a front face of the dashboard lower panel 15. The rear end of the front side frame 16 is fixed to a front face 15a of the dashboard lower panel 15, the upper end of the front damper housing 17 is fixed to an inner face in the vehicle width direction of an upper member 19 extending downward to the front from the upper end of the front pillar lower 14, and the rear end of a front side frame extension part 20 having a constant closed cross-section formed by extrusion of an aluminum alloy is welded to the front end of the front side frame 16.

A rectangular frame-shaped front bulkhead 22 is connected to front ends of a pair of left and right lower members 21 and 21 extending so as to curve inward in the vehicle width direction from the front ends of the left and right upper members 19 and front ends of the left and right front side frame extension parts 20 and 20. A bumper beam 25 is supported via bumper beam extensions 24 and 24 on front faces of a pair of left and right stays 23 and 23 extending outwardly in the vehicle width direction from the front bulkhead 22.

Supported on the left and right cast members 18 and 18 via mounts 30 and 30 are opposite end parts in the vehicle width direction of a power unit 29 integrally including an internal combustion engine 26, an electric motor 27, and a transmission 28.

The structure of the cast member 18 is now explained in detail by reference to FIG. 2 to FIG. 8.

Figure 3:
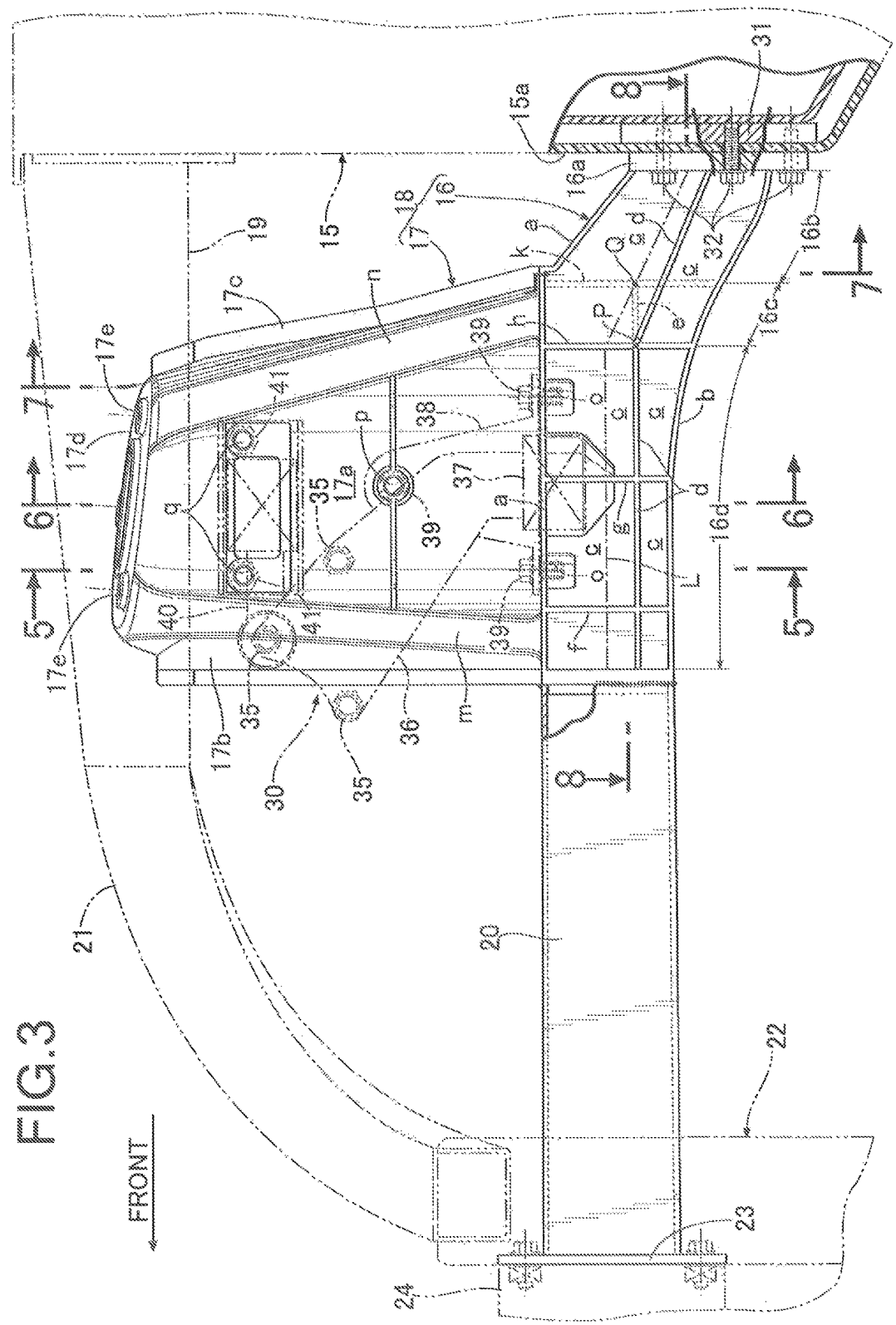
FIG. 3 is a view in the direction of arrow 3 in FIG. 2. (first embodiment)
Figure 4:
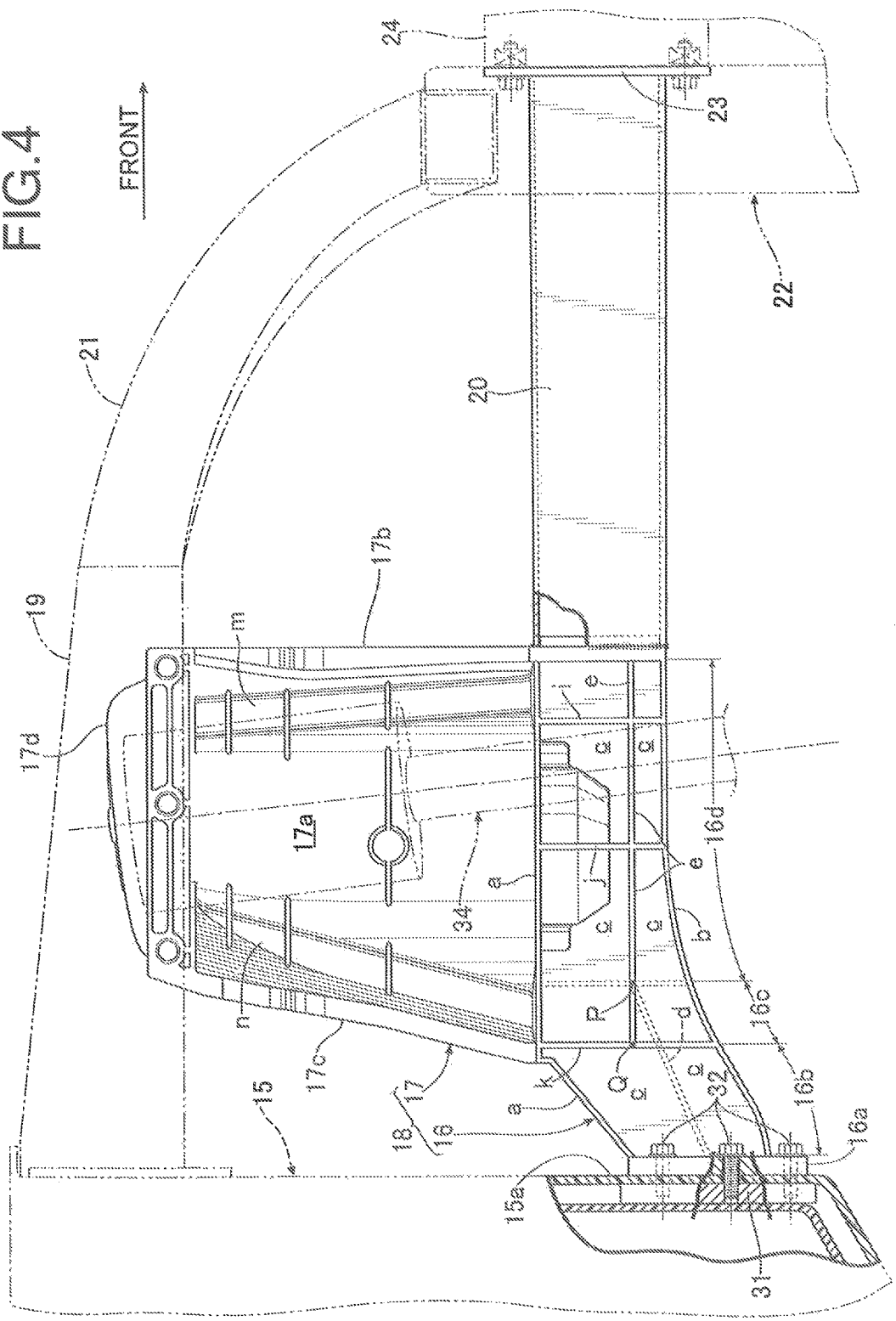
FIG. 4 is a view in the direction of arrow 4 in FIG. 2. (first embodiment)
Figure 5:
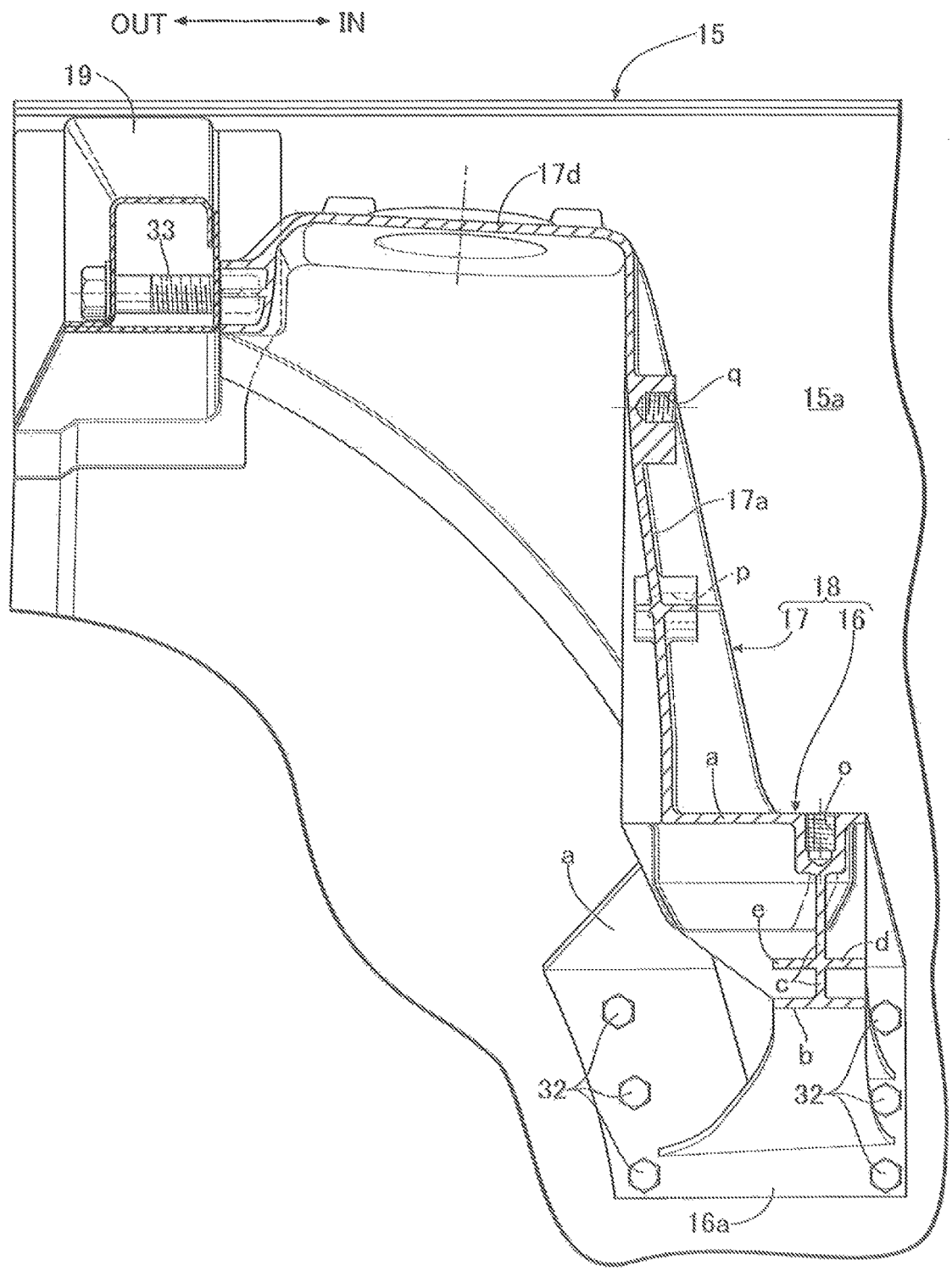
FIG. 5 is a sectional view along line 5-5 in FIG. 3. (first embodiment)
Figure 8:
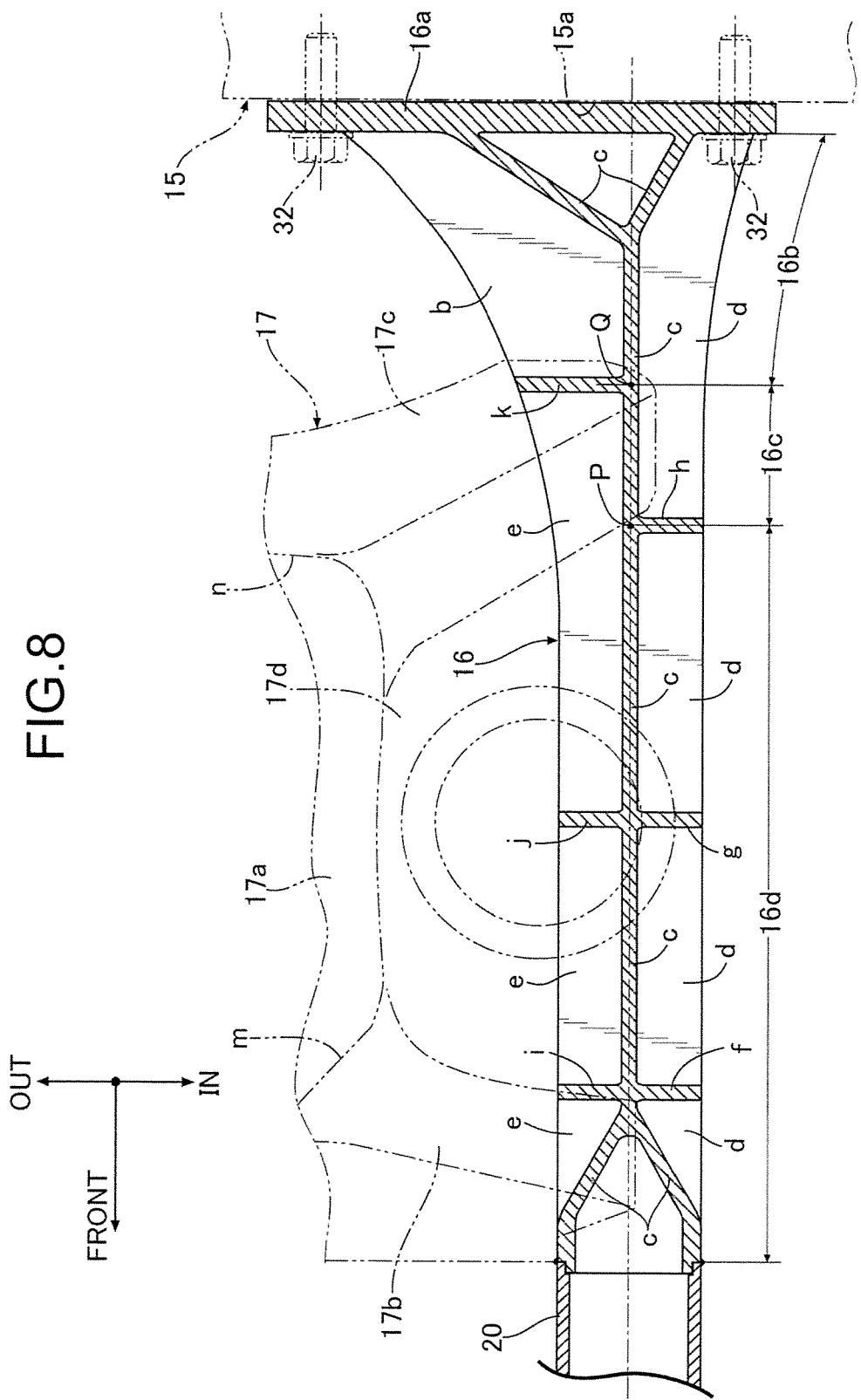
FIG. 8 is a sectional view along line 8-8 in FIG. 3. (first embodiment)

As is clear from FIG. 3, FIG. 4, and FIG. 8, the front side frame 16 includes a plate-shaped fixed portion 16a abutting against the front face 15a of the dashboard lower panel 15 and secured via bolts 32 to a reinforcing plate 31 embedded in the interior of the dashboard lower panel 15, an inclined portion 16b extending upward to the front from a front face of the fixed portion 16a, a bent portion 16c bending in a substantially horizontal direction from the front end of the inclined portion 16b, and a horizontal portion 16d extending forward from the front end of the bent portion 16c. The height in the vertical direction of the inclined portion 16b increases slightly in going from the fixed portion 16a toward the bent portion 16c and is substantially constant in the horizontal portion 16d (see FIG. 2 and FIG. 3). Furthermore, the width in the vehicle width direction of the inclined portion 16b decreases rapidly in going from the fixed portion 16a toward the bent portion 16c and is substantially constant in the horizontal portion 16d (see FIG. 8).

The cross section of the entire region of the inclined portion 16b, the bent portion 16c, and the horizontal portion 16d includes a main body part formed into an 'I'-shaped or an 'H'-shaped form while including an upper flange a and a lower flange b extending in the horizontal direction, and a web c connecting the upper flange a and the lower flange b in the vertical direction. A first reinforcing rib d extending in the fore-and-aft direction is provided so as to project inwardly in the vehicle width direction on an inner face in the vehicle width direction of the web c of the main body part (see FIG. 3). As shown by the chain line in FIG. 3, a line L joining the center of the cross section of the front side frame 16 extends in the horizontal direction from the front to the rear in the horizontal portion 16d, bends in the bent portion 16c, and extends downward to the rear in the inclined portion 16b. The first reinforcing rib d is disposed at a position moved parallel to and downward from the line L.

On the other hand, a second reinforcing rib e extending in the fore-and-aft direction is provided so as to project outwardly in the vehicle width direction on an outer face in the vehicle width direction of the web c of the main body part (see FIG. 4). The second reinforcing rib e is provided only on the horizontal portion 16d and the bent portion 16c and is not provided on the inclined portion 16b (see FIG. 7). When viewed in the vehicle width direction, the first reinforcing rib d and the second reinforcing rib e overlap one another at the same height (see FIG. 5 and FIG. 6).

Third to fifth reinforcing ribs f, g, and h, which connect the upper flange a, the first reinforcing rib d, and the lower flange b in the vertical direction, are provided so as to project inwardly in the vehicle width direction on the inner face in the vehicle width direction of the web c of the front side frame 16 (see FIG. 3). The third reinforcing rib f is disposed at a position close to the front end of the horizontal portion 16d, the fourth reinforcing rib g is disposed in an intermediate part in the fore-and-aft direction of the horizontal portion 16d, and the fifth reinforcing rib h is disposed at the rear end of the horizontal portion 16d, that is, on the border with the bent portion 16c. The first reinforcing rib d bends at an intersection part P where it intersects the fifth reinforcing rib h.

On the other hand, sixth to eighth reinforcing ribs i, j, and k, which connect the upper flange a, the second reinforcing rib e, and the lower flange b in the vertical direction, are provided so as to project outwardly in the vehicle width direction on an outer face in the vehicle width direction of the web c of the front side frame 16 (see FIG. 4). The sixth reinforcing rib i is disposed at a position that overlaps the third reinforcing rib f, the seventh reinforcing rib j is disposed at a position that overlaps the fourth reinforcing rib g, and the eighth reinforcing rib k is disposed at the front end of the inclined portion 16b, that is, on the border with the bent portion 16c. The second reinforcing rib e stops at an intersection part Q where it intersects the eighth reinforcing rib k.

The web c of the main body part bifurcates in front of the third reinforcing rib f and the sixth reinforcing rib I and also bifurcates in a rear half of the inclined portion 16b (see FIG. 8).

Figure 6:
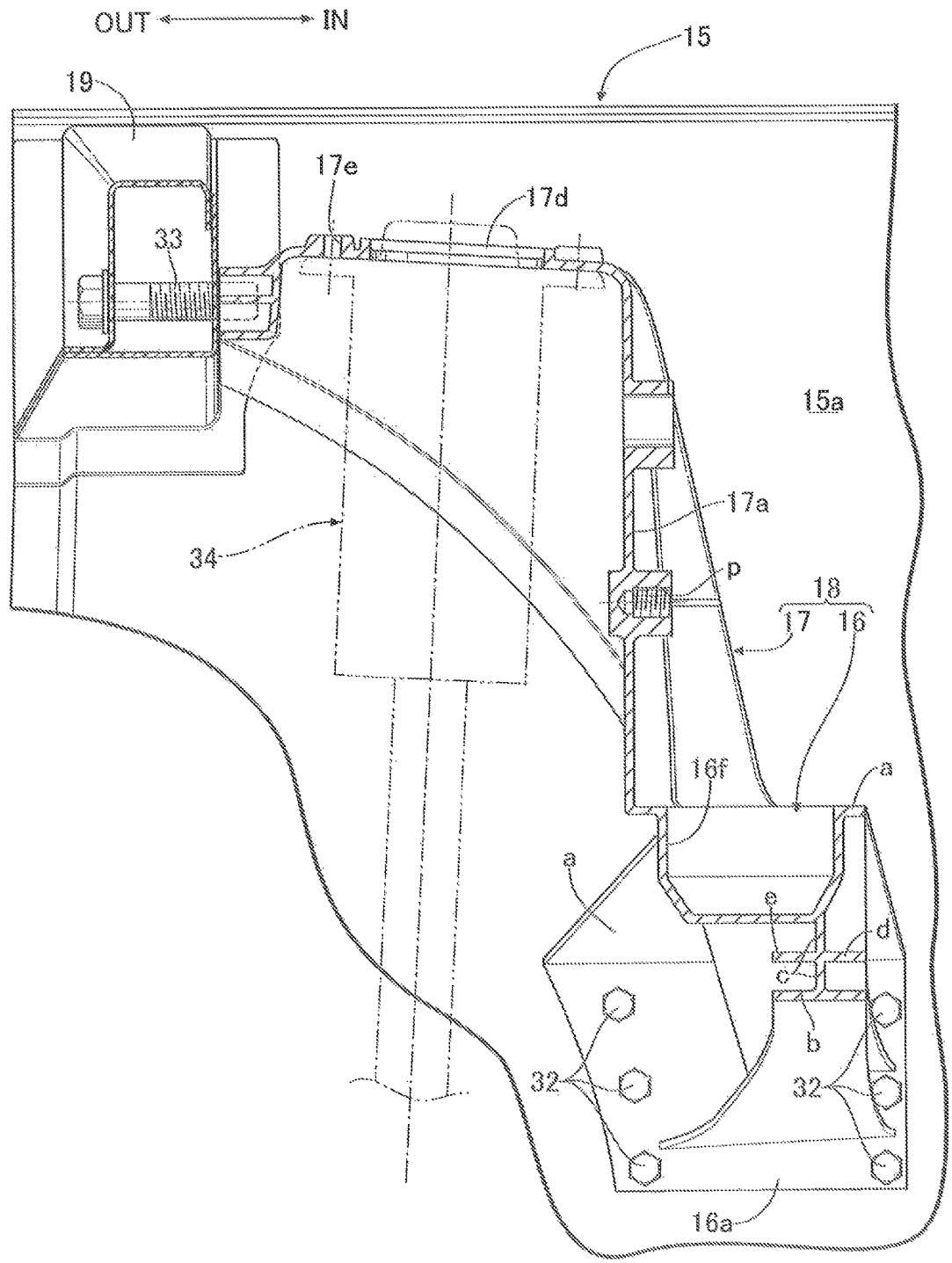
FIG. 6 is a sectional view along line 6-6 in FIG. 3. (first embodiment)
Figure 7:
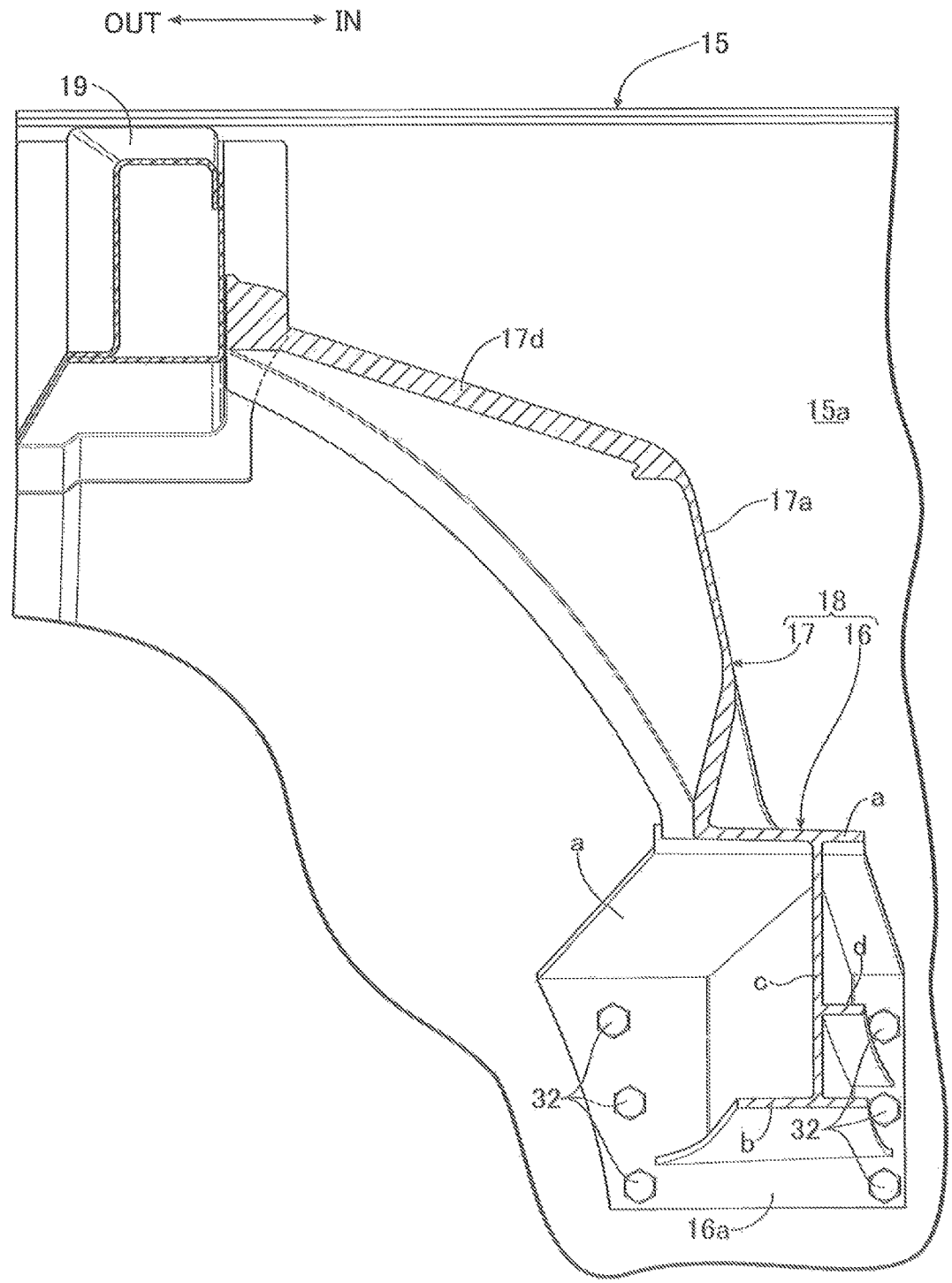
FIG. 7 is a sectional view along line 7-7 in FIG. 3. (first embodiment)

The upper flange a of the horizontal portion 16d of the front side frame 16 projects outwardly in the vehicle width direction into a semicircular shape, and a mounting fitting hole 16f, formed from a circular concave part recessed downward in a center part thereof, is formed by casting-in using a core (see FIG. 2 and FIG. 6).

As is clear from FIG. 2 to FIG. 6, the front damper housing 17 includes a vehicle width direction inner wall 17a, a front wall 17b, a rear wall 17c, and an upper wall 17d and rises upward and outwardly in the vehicle width direction from the upper flange a of the front side frame 16. The vehicle width direction inner wall 17a is curved protrudingly and outwardly in the vehicle width direction so as to surround half the periphery of the mounting fitting hole 16f, the front wall 17b continues from a front ridge line m outwardly in the vehicle width direction, and the rear wall 17c continues from a rear ridge line n outwardly in the vehicle width direction. The upper wall 17d connects upper ends of the vehicle width direction inner wall 17a, the front wall 17b, and the rear wall 17c and extends in the horizontal direction, and the outer end in the vehicle width direction thereof is fixed to an inner face in the vehicle width direction of the upper member 19 by a bolt 33 (see FIG. 5 and FIG. 6). Formed in a lower face of the upper wall 17d are three bolt holes 17e to which the upper ends of a front damper 34 of a front suspension are fixed.

As is clear from FIG. 3, a mounting bracket 36 is fixed to a right-hand face of the power unit 29 by three bolts 35, and a mounting bracket 38 of a cushion member 37 fitted into the mounting fitting hole 16f of the front side frame 16, the mounting bracket 38 being connected to the lower end of the mounting bracket 36, is fixed to two bolt holes o and o of the upper flange a of the front side frame 16 and a bolt hole p of the vehicle width direction inner wall 17a of the front damper housing 17 by means of three bolts 39. Furthermore, the rear end of a torque rod 40 having its front end connected to the upper end of the mounting bracket 36 is fixed to two bolt holes q and q of the vehicle width direction inner wall 17a of the front damper housing 17 by means of two bolts 41 and 41.

The structure of the part supporting a left-hand face of the power unit 29 on the left-hand side front side frame 16 and front damper housing 17 is substantially the same as the part supporting the right-hand face of the power unit 29 on the right-hand side front side frame 16 and front damper housing 17.

The operation of the first embodiment of the present invention having the above arrangement is now explained.

When the automobile is involved in a frontal collision, the collision load is transmitted from the bumper beam 25 to the front side frames 16 and 16 via the bumper beam extensions 24 and 24 and the front side frame extension parts 20 and 20, further transmitted from the front side frames 16 and 16 to the front face 15a of the dashboard lower panel 15, and also transmitted from the front side frames 16 and 16 to the upper members 19 and 19 via the front damper housings 17 and 17.

Figure 9:
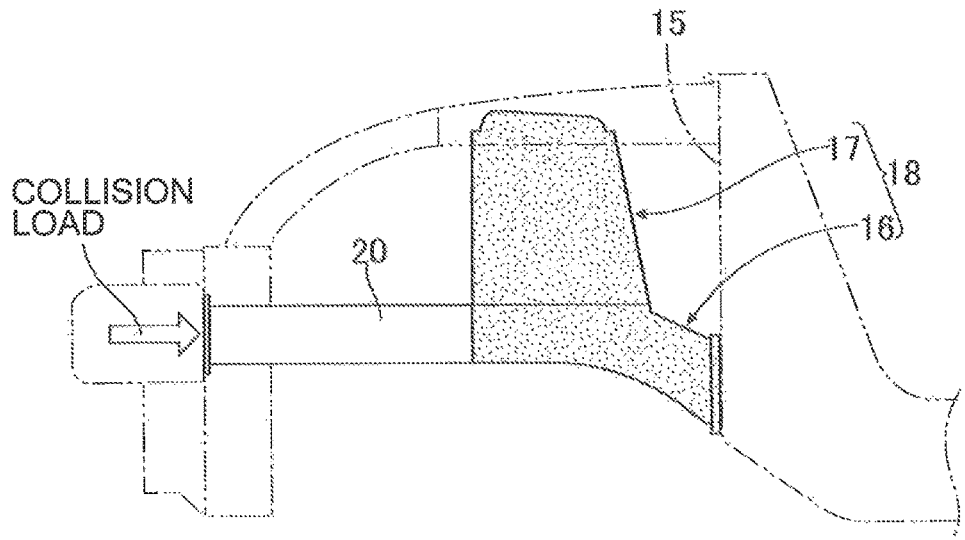
FIG. 9 is a diagram for explaining the operation when a front side frame buckles. (first embodiment)
Figure 9:
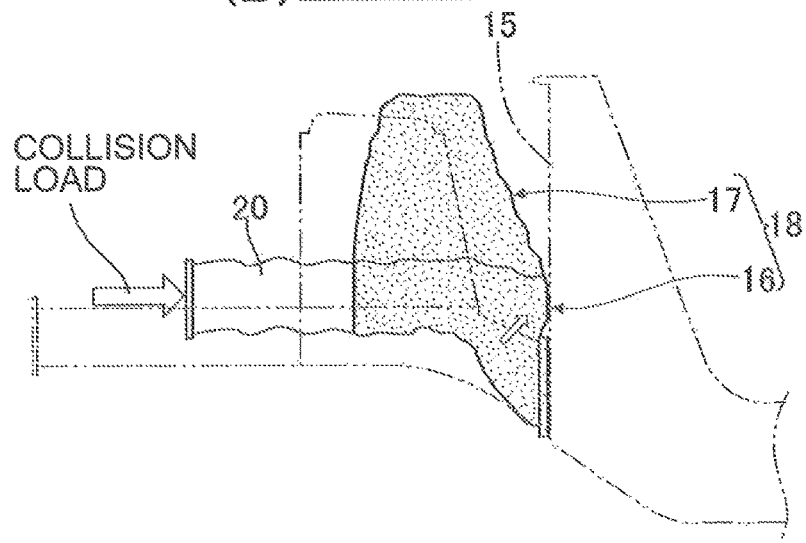

Since the front side frame 16 includes the bent portion 16c and the inclined portion 16b to the rear of the horizontal portion 16d, into which the collision load is input, and the fixed portion 16a provided at the rear end of the inclined portion 16b is fixed to the front face 15a of the dashboard lower panel 15 by the bolts 32, as shown in FIG. 9 the bent portion 16c and the fixed portion 16a are buckled and bent back by means of the collision load, and the top of the inclined portion 16b sandwiched between the bent portion 16c and the fixed portion 16a abuts against the front face 15a of the dashboard lower panel 15. As a result, not only can the collision energy be absorbed by crumpling of the front side frame 16 itself, but the collision energy can also be efficiently absorbed due to the load transmission area through which the collision load is transmitted from the front side frame 16 to the dashboard lower panel 15 increasing to thus disperse the collision load over a wide region of the dashboard lower panel 15, which is made of a fiber-reinforced resin, and thereby prevent local breakage thereof and, moreover, the reaction force required for the dashboard lower panel 15 can be decreased, thereby enabling the weight to be lightened.

In this process, the front side frame 16 includes the first reinforcing rib d, which extends substantially parallel to the line L (see FIG. 3) joining the cross section centers of the inclined portion 16b, the bent portion 16c, and the horizontal portion 16d, and the second reinforcing rib e, which extends substantially horizontal in the fore-and-aft direction in the horizontal portion 16d; since the first reinforcing rib d and the second reinforcing rib e intersect each other in the intersection part P when viewed in the vehicle width direction, when the collision load of a frontal collision is input, the first reinforcing rib d is bent in the vicinity of the intersection part P while generating a constant reaction force by means of the second reinforcing rib e, thus inducing buckling of the front side frame 16 and enhancing the collision energy absorption performance.

Furthermore, not only is the strength of the front side frame 16 increased due to it including the third to eighth reinforcing ribs f, g, h, i, j, and k, which connect the upper flange a and the lower flange b in the vertical direction, but due to the fifth reinforcing rib h among them also intersecting at the intersection part P, where the first reinforcing rib d is bent back (see FIG. 3), it is also possible to concentrate stress on the intersection part P, thereby promoting bending back of the front side frame 16. Moreover, since the rear end of the second reinforcing rib e stops at the intersection part Q, where it intersects the eighth reinforcing rib k (see FIG. 4), crumpling of the inclined portion 16b of the front side frame 16 can be promoted.

Moreover, since the front side frame extension part 20, which is formed by extrusion, is welded to a part where the front end of the web c of the front side frame 16 bifurcates in going forward (see FIG. 8), not only can the cost of the mold be cut compared with a case in which the front side frame 16 and the front side frame extension part 20 are cast as a unit, but it is also possible to reliably transmit the collision load of a frontal collision input into the front side frame extension part 20 to the front end of the front side frame 16. Similarly, since the fixed portion 16a is connected to a part where the rear end of the web c of the front side frame 16 bifurcates in going rearward (see FIG. 8), it is possible to reliably transmit a collision load input into the front side frame 16 to the fixed portion 16a.

Furthermore, since the cross-sectional shape of the front side frame 16 includes the main body part, which is formed into an 'I'-shaped cross section or an 'H'-shaped cross section from the upper flange a and the lower flange b extending in the horizontal direction and the web c connecting the upper flange a and the lower flange b in the vertical direction, and the first reinforcing rib d and the second reinforcing rib e extend from the web c in the horizontal direction, removal from a mold becomes easy due to the mold for casting the front side frame 16 being divided in the vehicle width direction, thus cutting the production cost.

The maximum load that can be supported without crumpling of the dashboard lower panel 15 of the floor panel 12 can be estimated in advance, and it is desirable that the collision load of a frontal collision input from the front side frame 16 into the dashboard lower panel 15 is suppressed so as to be less than the maximum load. In accordance with the present embodiment, since it is possible to freely adjust the buckling strength of the front side frame 16 by adjusting the bending position of the first reinforcing rib d of the front side frame 16 (see the intersection part P in FIG. 3 and FIG. 4) in the fore-and-aft direction, it is possible by a simple adjustment to prevent the load input into the dashboard lower panel 15 from exceeding the maximum load.

Furthermore, since the cast member 18, which is made of metal, integrally includes the front side frame 16 and the front damper housing 17, and the power unit support part supporting via the mount 30 the end part in the vehicle width direction of the power unit 29 for a hybrid automobile, which integrally includes the internal combustion engine 26, the electric motor 27, and the transmission 28, is formed on the upper face of the front side frame 16 and the inner face in the vehicle width direction of the front damper housing 17, it is possible to arrange the power unit 29 compactly in the vicinity of the dashboard lower panel 15, thus ensuring that there is space for arranging an accessory such as an ABS system or an oil pump in front thereof.

Moreover, since the front side frame 16 and the front damper housing 17 are formed integrally, not only can the number of components be cut, but it is also possible to enhance the support strength of the power unit 29 due to the front side frame 16 and the front damper housing 17 reinforcing each other.

In particular, since the front ridge line m formed between the front wall 17b and the vehicle width direction inner wall 17a of the front damper housing 17 and the rear ridge line n formed between the rear wall 17c and the vehicle width direction inner wall 17a of the front damper housing 17 are connected to the front side frame 16 (see FIG. 2), it is possible to strongly integrate the front side frame 16 and the front damper housing 17 and transport and disperse the collision load of a frontal collision input into the front side frame 16 from both the front side frame 16 and the front damper housing 17 to the dashboard lower panel 15 or the upper member 19, thus enhancing the collision energy-absorbing effect.

In this process, since the front ridge line m and the rear ridge line n are connected to the middle part in the vehicle width direction of the upper face of the front side frame 16 (see FIG. 1), it is possible to reliably transmit the collision load input into the front side frame 16 to the front damper housing 17.

Furthermore, since the vehicle width direction inner wall 17a of the front damper housing 17 protrudes from the front side frame 16 outwardly in the vehicle width direction, it is possible to dispose the front damper 34, whose upper end is supported on the front damper housing 17, in a nearly vertical attitude when viewed from the front (see FIG. 6), thereby enabling the load transmitted from a wheel to be efficiently supported by means of the front damper housing 17.

Moreover, since the mounting fitting hole 16f forming the power unit support part is formed integrally with the front side frame 16, and the mounting fitting hole 16f is wider than the width in the vehicle width direction of the upper face of the front side frame 16 (see FIG. 1), it is possible to support the power unit 29 on the front side frame 16 via the mount 30, which has large dimensions.

Furthermore, since the vehicle width direction inner wall 17a of the front damper housing 17 curves protrudingly and outwardly in the vehicle width direction, the mount support part on the front side frame 16 side is formed from the mounting fitting hole 16f, into which the cushion member 37 of the mount 30 is fitted, and the two bolt holes o and o, which secure a lower part of the mounting bracket 38 of the mount 30, and the mount support part on the front damper housing 17 side is formed from the bolt hole p, which secures an upper part of the mounting bracket 38 of the mount 30, and the bolt holes q and q, which secure the torque rod 40, it is possible to strongly support the power unit 29 on the front side frame 16 and the front damper housing 17.

Second Embodiment

Figure 10:
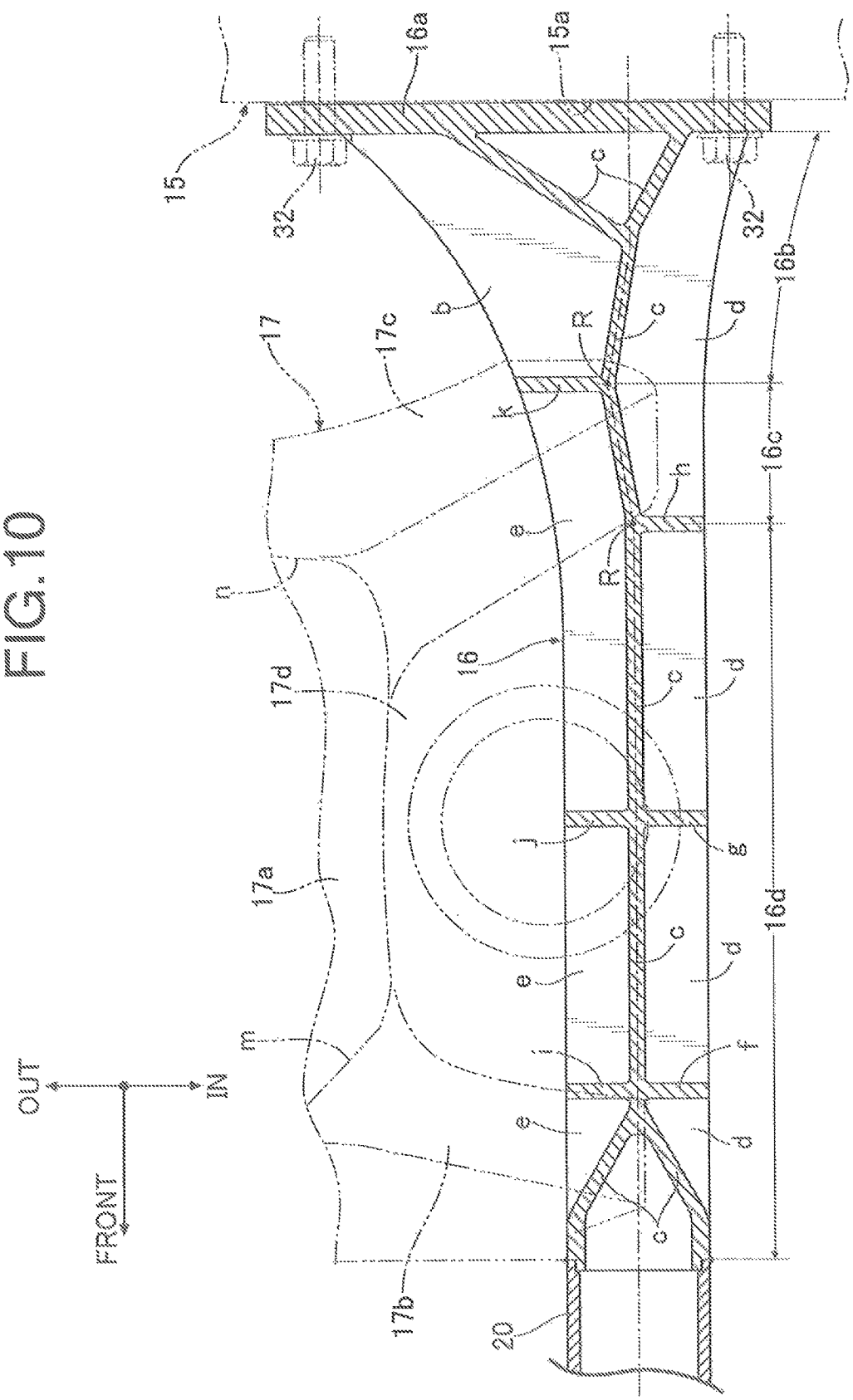
FIG. 10 is a view corresponding to FIG. 8 of the first embodiment. (second embodiment)

A second embodiment of the present invention is now explained by reference to FIG. 10.

In the first embodiment, the web c of the front side frame 16 is formed into a straight line shape in plan view apart from its front end part and rear end part, but in the second embodiment a web c includes bent parts R at two positions. Due to these bent parts R, it is possible to promote buckling of a front side frame 16 when the collision load of a frontal collision is input, thus further enhancing the collision energy-absorbing performance.

Third Embodiment

A third embodiment of the present invention is now explained by reference to FIG. 11.

In the first embodiment, since the mounting fitting hole 16f is formed in the upper flange a of the horizontal portion 16d of the front side frame 16, the first reinforcing rib d and the second reinforcing rib e are displaced downward from the line L joining the cross section centers in order to avoid interference with the mounting fitting hole 16f. Since a front side frame 16 of the third embodiment does not include a mounting fitting hole 16f, a first reinforcing rib d and a second reinforcing rib e are formed on a line L joining cross section centers. This enables the strength of the front side frame 16 to be further enhanced by means of the first reinforcing rib d and the second reinforcing rib e.

Embodiments of the present invention are explained above, but the present invention may be modified in a variety of ways as long as the modifications do not depart from the spirit and scope thereof.

For example, in the embodiments, the first reinforcing rib d is provided on the inner face in the vehicle width direction of the web c of the front side frame 16, and the second reinforcing rib e is provided on the outer face in the vehicle width direction, but the positional relationship between the first reinforcing rib d and the second reinforcing rib e may be reversed, or both the first reinforcing rib d and the second reinforcing rib e may be provided on one side face of the web c.

Furthermore, the power unit support part of the present invention is not limited to the mounting fitting hole 16f of the embodiment.

The invention claimed is:

1. An automobile body structure in which a rear end of a front side frame made of metal is fixed to a front face of a dashboard lower panel of a vehicle body formed into a bathtub shape from a fiber-reinforced resin, wherein
the front side frame comprises a plate-shaped fixed portion that is fixed to the front face of the dashboard lower panel, an inclined portion that extends from the fixed portion upward in a forward direction, a bent portion that bends from a front end of the inclined portion in a substantially horizontal direction, and a horizontal portion that extends from a front end of the bent portion in the forward direction,
the front side frame has a front damper housing formed integrally therewith, a power unit support part is formed on an upper face of the front side frame and an inner face in the vehicle width direction of the front damper housing, the power unit support part supporting via a mount an end part in the vehicle width direction of a power unit integrally having an internal combustion engine, an electric motor and a transmission, and a front ridge line formed between a front wall and a vehicle width direction inner wall of the front damper housing and a rear ridge line formed between a rear wall and the vehicle width direction inner wall of the front damper housing are connected to the front side frame, and
the power unit support part of the front side frame is wider than the width in the vehicle width direction of the upper face of the front side frame.

2. The automobile body structure according to claim 1, wherein the vehicle width direction inner wall of the front damper housing is curved so as to protrude outwardly in the vehicle width direction, the power unit support part on the front side frame side comprises a mounting fitting hole that has the mount fitted thereinto and a bolt hole that has the mount secured thereto, and the power unit support part on the front damper housing side comprises a bolt hole that has the mount secured thereto and a bolt hole that has a torque rod secured thereto.

3. The automobile body structure according to claim 2, wherein the front side frame has a cross-sectional shape comprising a main body part formed into an 'I'-shaped cross section from an upper flange and a lower flange that extend in the horizontal direction and a web that connects the upper flange and the lower flange in the vertical direction, and a first reinforcing rib is formed so as to extend from a front end to a rear end of the main body part, the first reinforcing rib protruding in the horizontal direction from at least one side face in the vehicle width direction of the web.

4. The automobile body structure according to claim 1, wherein the front side frame has a cross-sectional shape comprising a main body part formed into an 'I'-shaped cross section from an upper flange and a lower flange that extend in the horizontal direction and a web that connects the upper flange and the lower flange in the vertical direction, and a first reinforcing rib is formed so as to extend from a front end to a rear end of the main body part, the first reinforcing rib protruding in the horizontal direction from at least one side face in the vehicle width direction of the web.

5. The automobile body structure according to claim 4, wherein a second reinforcing rib protruding in the horizontal direction from at least the other side face in the vehicle width direction of the web is formed so as to extend from the front end to the rear end of the main body part.

6. The automobile body structure according to claim 5, wherein a front side frame extension part formed by extrusion is welded to a part that opens out in a bifurcated shape from the front end of the web in the forward direction.

7. The automobile body structure according to claim 4, wherein a front side frame extension part formed by extrusion is welded to a part that opens out in a bifurcated shape from the front end of the web in the forward direction.

* * * * *